United States Patent
Aljubran et al.

(10) Patent No.: US 10,941,644 B2
(45) Date of Patent: Mar. 9, 2021

(54) DOWNHOLE WELL INTEGRITY RECONSTRUCTION IN THE HYDROCARBON INDUSTRY

(71) Applicant: Saudi Arabian Oil Company, Dhahran (SA)

(72) Inventors: Mohammad Aljubran, Damman (SA); Hussain AlBahrani, Qatif (SA); Sameeh Issa Batarseh, Dhahran (SA); Timothy E. Moellendick, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 290 days.

(21) Appl. No.: 15/900,427

(22) Filed: Feb. 20, 2018

(65) Prior Publication Data

US 2019/0257187 A1   Aug. 22, 2019

(51) Int. Cl.
| | | |
|---|---|---|
| *E21B 47/00* | (2012.01) | |
| *E21B 47/002* | (2012.01) | |
| *E21B 33/12* | (2006.01) | |
| *G01V 1/48* | (2006.01) | |
| *E21B 29/10* | (2006.01) | |
| *E21B 41/00* | (2006.01) | |
| *E21B 47/26* | (2012.01) | |
| *E21B 47/113* | (2012.01) | |
| *E21B 47/117* | (2012.01) | |

(52) U.S. Cl.
CPC ......... *E21B 47/002* (2020.05); *E21B 29/10* (2013.01); *E21B 33/12* (2013.01); *E21B 41/00* (2013.01); *E21B 47/113* (2020.05); *E21B 47/117* (2020.05); *E21B 47/26* (2020.05); *G01V 1/48* (2013.01); *G01V 2210/6163* (2013.01)

(58) Field of Classification Search
None
See application file for complete search history.

(56) References Cited

U.S. PATENT DOCUMENTS

| | | |
|---|---|---|
| 2,757,738 A | 9/1948 | Ritchey |
| 2,795,279 A | 6/1957 | Erich |
| 2,799,641 A | 7/1957 | Gordon |

(Continued)

FOREIGN PATENT DOCUMENTS

| | | | |
|---|---|---|---|
| CA | 2669721 | 7/2011 | |
| CN | 101079591 | * 11/2007 | ............... H03B 5/04 |

(Continued)

OTHER PUBLICATIONS

Ruiter et al., "3D ultrasound computer tomography of the breast: A new era?" European Journal of Radiology 81S1, Sep. 2012, 2 pages.

(Continued)

*Primary Examiner* — Tung S Lau
(74) *Attorney, Agent, or Firm* — Fish & Richardson P.C.

(57) ABSTRACT

The present disclosure describes methods and systems for downhole well integrity reconstruction in a hydrocarbon reservoir. One method for downhole well integrity reconstruction in a hydrocarbon reservoir includes: positioning, a laser head at a first subterranean location, wherein the laser head is attached to a tubular inside of a wellbore; directing, by the laser head, a laser beam towards a leak on the wellbore; and sealing the leak using the laser beam.

8 Claims, 9 Drawing Sheets

(56) References Cited

U.S. PATENT DOCUMENTS

| | | |
|---|---|---|
| 3,016,244 A | 1/1962 | Friedrich et al. |
| 3,103,975 A | 9/1963 | Hanson |
| 3,104,711 A | 9/1963 | Haagensen |
| 3,114,875 A | 12/1963 | Haagensen |
| 3,133,592 A | 5/1964 | Tomberlin |
| 3,137,347 A | 6/1964 | Parker |
| 3,149,672 A | 9/1964 | Joseph et al. |
| 3,169,577 A | 2/1965 | Erich |
| 3,170,519 A | 2/1965 | Haagensen |
| 3,211,220 A | 10/1965 | Erich |
| 3,428,125 A | 2/1969 | Parker |
| 3,522,848 A | 8/1970 | New |
| 3,547,192 A | 12/1970 | Claridge et al. |
| 3,547,193 A | 12/1970 | Gill |
| 3,642,066 A | 2/1972 | Gill |
| 3,696,866 A | 10/1972 | Dryden |
| 3,862,662 A | 1/1975 | Kern |
| 3,874,450 A | 4/1975 | Kern |
| 3,931,856 A | 1/1976 | Barnes |
| 3,946,809 A | 3/1976 | Hagedorn |
| 3,948,319 A | 4/1976 | Pritchett |
| 4,008,762 A | 2/1977 | Fisher et al. |
| 4,010,799 A | 3/1977 | Kern et al. |
| 4,084,637 A | 4/1978 | Todd |
| 4,135,579 A | 1/1979 | Rowland et al. |
| 4,140,179 A | 2/1979 | Kasevich et al. |
| 4,140,180 A | 2/1979 | Bridges et al. |
| 4,144,935 A | 3/1979 | Bridges et al. |
| 4,193,448 A | 3/1980 | Jearnbey |
| 4,193,451 A | 3/1980 | Dauphine |
| 4,196,329 A | 4/1980 | Rowland et al. |
| 4,199,025 A | 4/1980 | Carpenter |
| 4,265,307 A | 5/1981 | Elkins |
| RE30,738 E | 9/1981 | Bridges et al. |
| 4,301,865 A | 11/1981 | Kasevich et al. |
| 4,320,801 A | 3/1982 | Rowland et al. |
| 4,373,581 A | 2/1983 | Toellner |
| 4,396,062 A | 8/1983 | Iskander |
| 4,412,585 A | 11/1983 | Bouck |
| 4,449,585 A | 5/1984 | Bridges et al. |
| 4,457,365 A | 7/1984 | Kasevich et al. |
| 4,470,459 A | 9/1984 | Copland |
| 4,476,926 A | 10/1984 | Bridges et al. |
| 4,484,627 A | 11/1984 | Perkins |
| 4,485,868 A | 12/1984 | Sresty et al. |
| 4,485,869 A | 12/1984 | Sresty et al. |
| 4,487,257 A | 12/1984 | Dauphine |
| 4,495,990 A | 1/1985 | Titus et al. |
| 4,498,535 A | 2/1985 | Bridges |
| 4,499,948 A | 2/1985 | Perkins |
| 4,508,168 A | 4/1985 | Heeren |
| 4,513,815 A | 4/1985 | Rundell et al. |
| 4,524,826 A | 6/1985 | Savage |
| 4,524,827 A | 6/1985 | Bridges et al. |
| 4,545,435 A | 10/1985 | Bridges et al. |
| 4,553,592 A | 11/1985 | Looney et al. |
| 4,576,231 A | 3/1986 | Dowling et al. |
| 4,583,589 A | 4/1986 | Kasevich |
| 4,592,423 A | 6/1986 | Savage et al. |
| 4,612,988 A | 9/1986 | Segalman |
| 4,620,593 A | 11/1986 | Haagensen |
| 4,660,636 A | 4/1987 | Rundell et al. |
| 4,705,108 A | 11/1987 | Little et al. |
| 4,817,711 A | 4/1989 | Jearnbey |
| 5,055,180 A | 10/1991 | Klaila |
| 5,068,819 A | 11/1991 | Misra et al. |
| 5,082,054 A | 1/1992 | Kiamanesh |
| 5,236,039 A | 8/1993 | Edelstein et al. |
| 5,899,274 A | 5/1999 | Frauenfeld et al. |
| 6,041,860 A | 3/2000 | Nazzal et al. |
| 6,189,611 B1 | 2/2001 | Kasevich |
| 6,413,399 B1 | 7/2002 | Kasevich |
| 6,544,411 B2 | 4/2003 | Varandaraj |
| 6,678,616 B1 | 1/2004 | Winkler et al. |
| 6,814,141 B2 | 11/2004 | Huh et al. |
| 7,048,051 B2 | 5/2006 | McQueen |
| 7,091,460 B2 | 8/2006 | Kinzer |
| 7,109,457 B2 | 9/2006 | Kinzer |
| 7,115,847 B2 | 10/2006 | Kinzer |
| 7,131,498 B2 | 11/2006 | Campo et al. |
| 7,312,428 B2 | 12/2007 | Kinzer |
| 7,331,385 B2 | 2/2008 | Symington |
| 7,445,041 B2 | 11/2008 | O'Brien |
| 7,461,693 B2 | 12/2008 | Considine et al. |
| 7,484,561 B2 | 2/2009 | Bridges |
| 7,562,708 B2 | 7/2009 | Cogliandro et al. |
| 7,629,497 B2 | 12/2009 | Pringle |
| 7,631,691 B2 | 12/2009 | Symington et al. |
| 7,677,673 B2 | 3/2010 | Tranquilla et al. |
| 7,828,057 B2 | 11/2010 | Kearl et al. |
| 7,909,096 B2 | 3/2011 | Clark et al. |
| 8,096,349 B2 | 1/2012 | Considine et al. |
| 8,210,256 B2 | 7/2012 | Bridges et al. |
| 8,526,171 B2 | 9/2013 | Wu et al. |
| 8,678,087 B2 | 3/2014 | Schultz et al. |
| 8,960,215 B2 | 2/2015 | Cui et al. |
| 9,217,291 B2 | 12/2015 | Batarseh |
| 9,567,819 B2 | 2/2017 | Cavender et al. |
| 9,765,609 B2 | 9/2017 | Chemali et al. |
| 10,641,079 B2 * | 5/2020 | Aljubran ............... E21B 47/007 |
| 2004/0256103 A1 | 12/2004 | Batarseh |
| 2005/0199386 A1 | 9/2005 | Kinzer |
| 2006/0076347 A1 | 4/2006 | Kinzer |
| 2006/0102625 A1 | 5/2006 | Kinzer |
| 2006/0106541 A1 | 5/2006 | Hassan et al. |
| 2007/0000662 A1 | 1/2007 | Symington et al. |
| 2007/0108202 A1 | 5/2007 | Kinzer |
| 2007/0131591 A1 | 6/2007 | Pringle |
| 2007/0137852 A1 | 6/2007 | Considine et al. |
| 2007/0137858 A1 | 6/2007 | Considine et al. |
| 2007/0153626 A1 | 7/2007 | Hayes et al. |
| 2007/0181301 A1 | 8/2007 | O'Brien |
| 2007/0187089 A1 | 8/2007 | Bridges |
| 2007/0193744 A1 | 8/2007 | Bridges |
| 2007/0204994 A1 | 9/2007 | Wimmersperg |
| 2007/0261844 A1 | 11/2007 | Cogliandro et al. |
| 2007/0289736 A1 | 12/2007 | Kearl et al. |
| 2008/0073079 A1 | 3/2008 | Tranquilla et al. |
| 2008/0173443 A1 | 7/2008 | Symington et al. |
| 2009/0259446 A1 | 10/2009 | Zhang et al. |
| 2009/0288820 A1 | 11/2009 | Barron et al. |
| 2010/0186955 A1 | 7/2010 | Saasen et al. |
| 2011/0011576 A1 | 1/2011 | Cavender et al. |
| 2012/0012319 A1 | 1/2012 | Dennis |
| 2012/0075615 A1 | 3/2012 | Niclass et al. |
| 2012/0169841 A1 | 6/2012 | Chemali et al. |
| 2012/0181020 A1 | 7/2012 | Barron et al. |
| 2013/0008653 A1 * | 1/2013 | Schultz ................ E21B 43/12 |
| | | 166/285 |
| 2013/0037268 A1 * | 2/2013 | Kleefisch ............. E21B 43/11 |
| | | 166/297 |
| 2013/0126164 A1 | 5/2013 | Sweatman et al. |
| 2013/0191029 A1 | 7/2013 | Heck, Sr. |
| 2013/0213637 A1 | 8/2013 | Kearl |
| 2013/0255936 A1 | 10/2013 | Statoilydro et al. |
| 2014/0034144 A1 | 2/2014 | Cui et al. |
| 2014/0090846 A1 | 4/2014 | Deutch |
| 2014/0231147 A1 * | 8/2014 | Bozso .................. E21B 7/061 |
| | | 175/73 |
| 2014/0278111 A1 * | 9/2014 | Gerrie ................. E21B 47/002 |
| | | 702/8 |
| 2014/0360778 A1 | 12/2014 | Batarseh |
| 2016/0153240 A1 * | 6/2016 | Braga .................. E21B 7/06 |
| | | 175/11 |
| 2016/0247316 A1 | 8/2016 | Whalley et al. |
| 2017/0234104 A1 | 8/2017 | James |
| 2018/0010419 A1 | 1/2018 | Livescu et al. |
| 2018/0266226 A1 | 9/2018 | Batarseh et al. |

FOREIGN PATENT DOCUMENTS

| | | | |
|---|---|---|---|
| CN | 102493813 | * 6/2012 | ............ E21D 9/08 |
| CN | 104295448 | * 1/2015 | ............ F03D 9/008 |

(56) References Cited

FOREIGN PATENT DOCUMENTS

| CN | 204627586 | | 9/2015 | |
|---|---|---|---|---|
| CN | 107462222 | | 12/2017 | |
| EP | 2317068 | * | 5/2011 | ............ E21B 47/113 |
| EP | 2737173 | | 6/2014 | |
| WO | WO2008146017 | | 12/2008 | |
| WO | WO2009020889 | | 2/2009 | |
| WO | WO2011038170 | | 3/2011 | |
| WO | WO2015095155 | | 6/2015 | |
| WO | WO2017011078 | | 1/2017 | |
| WO | WO2018169991 | | 9/2018 | |

OTHER PUBLICATIONS

Gemmeke and Ruiter, "3D ultrasound computer tomography for medical imagining," Nuclear Instruments and Methods in Physics Research A 580, Oct. 1, 2007, 9 pages.

Johnson, "Design and Testing of a Laboratory Ultrasonic Data Acquisition System for Tomography" Thesis for the degree of Master of Science in Mining and Minerals Engineering, Virginia Polytechnic Institute and State University, Dec. 2, 2004, 108 pages.

Gcc Examination Report in GCC Appln. No. Gc 2019-37065, dated Mar. 16, 2020, 5 pages.

PCT International Search Report and Written Opinion issued in International Application No. PCT/US2020/015406 dated May 14, 2020, 13 pages.

GCC Examination Report in GCC Appln. No. GC 2019-37064, dated May 5, 2020, 4 pages.

GCC Examination Report in GCC Appln. No. GC 2019-37065, dated Jul. 11, 2020, 4 pages.

International Search Report and Written Opinion issued in International Application No. PCT/US2019/030171 dated Jul. 22, 2019, 14 pages.

International Search Report and Written Opinion issued in International Application No. PCT/US2019/017441 dated Apr. 23, 2019, 17 pages.

International Search Report and Written Opinion issued in International Application No. PCT/US2019/017439 dated Jul. 1, 2019, 23 pages.

Invitation to Pay Additional Fees and, Where Applicable, Protest Fee, issued in International Application No. PCT/US2019/017439 dated Apr. 18, 2019, 14 pages.

* cited by examiner

DOWNHOLE WELL INTEGRITY RECONSTRUCTION IN THE HYDROCARBON INDUSTRY

TECHNICAL FIELD

This disclosure relates to discovering and fixing downhole well integrity issues in the hydrocarbon industry.

BACKGROUND

In the hydrocarbon production industry, well integrity is an important issue to be monitored and maintained. Example of well integrity issues can include borehole rock instability issues, cased hole leaking or split casing issues, deteriorated casing section issues.

SUMMARY

The present disclosure describes methods and systems for discovering and fixing downhole well integrity issues. One method includes positioning, a laser head at a first subterranean location, wherein the laser head is attached to a tubular inside of a wellbore; directing, by the laser head, a laser beam towards a leak on the wellbore; and sealing the leak using the laser beam.

Another method for downhole well leak detection in a hydrocarbon reservoir, includes positioning, a 3-dimensional (3D) scanner at a subterranean location, wherein the 3D scanner is attached to a tubular inside of a wellbore; generating an image of the subterranean location; and transmitting the image to a surface of a well.

Yet another method for downhole well integrity reconstruction in a hydrocarbon reservoir includes: positioning, a 3-dimensional (3D) scanner at a subterranean location, wherein the 3D scanner is attached to a tubular inside of a wellbore; generating an image of the subterranean location; determining, based on the image, that a leak is located at the subterranean location; positioning, a laser head at the subterranean location, wherein the laser head is attached to the tubular; directing, by the laser head, a laser beam towards the leak; and sealing the leak using the laser beam.

One in-situ well integrity reconstruction device includes: a 3-dimensional (3D) laser head; at least one hardware processor; and a non-transitory computer-readable storage medium coupled to the at least one hardware processor and storing programming instructions for execution by the at least one hardware processor, wherein the programming instructions, when executed, cause the in-situ well integrity reconstruction device to perform operations comprising: positioning, the 3D laser head at a first subterranean location, wherein the 3D laser head is attached to a tubular inside of a wellbore; and wherein the 3D laser head is configured to: direct a laser beam towards a leak at the first subterranean location; and seal the leak using the laser beam.

One in-situ 3-dimensional (3D) laser head includes a reflector that is attached to a tubular inside of a wellbore; a focused lens; and wherein the reflector is configured to reflect a laser beam towards the focused lens; and the reflector and the focused lens are configured to be rotatable to aim towards a leak on the wellbore.

One in-situ 3-dimensional (3D) scanner includes: a rangefinder configured to measure a distance between a subterranean location and a surface of a well; and a radiance sensor configured to generate a depth map of the subterranean location.

The details of one or more implementations of the subject matter of this disclosure are set forth in the accompanying drawings and the description. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1A:
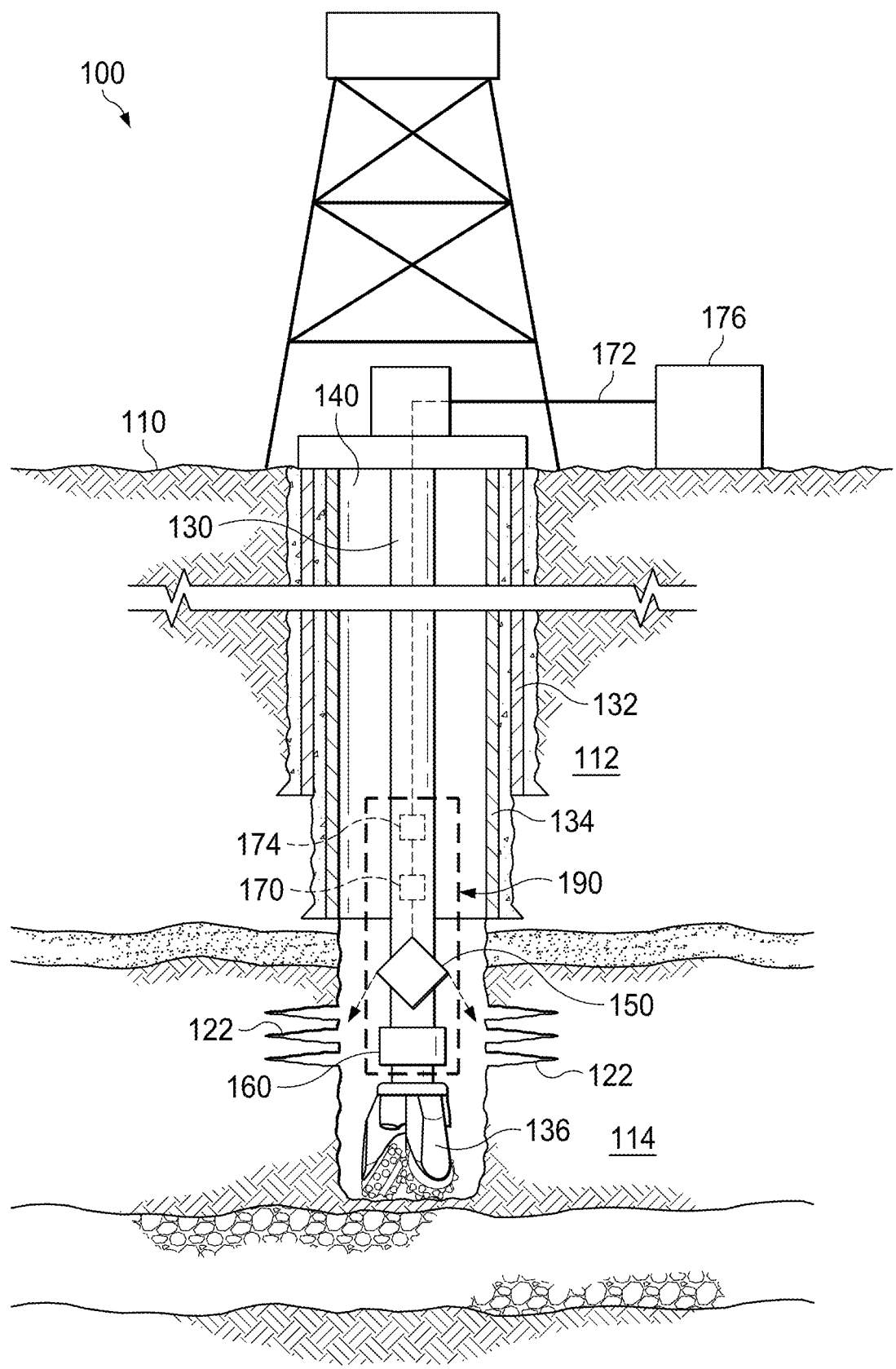
FIG. 1A is a schematic diagram that illustrates an example well system having an open hole problem, according to an implementation.

This disclosure generally describes methods and systems for discovering and fixing downhole well integrity issues. Well integrity issues can include issues for cased holes and open holes. Cased hole problems can happen due to casing decentralization, poor cement jobs, leaking packers or tubing, the existence of corrosive formations, and other reasons. In some implementations, techniques for solving cased hole problems can include casing squeeze, sealant technologies, and mechanical casing repairs. However, these techniques may have several drawbacks, including, for example, limited isolation and integrity, short life, high cost and time consumption, limited probability of operational success, and downhole restriction. Open hole problems can happen due to lost circulations (because of seepage, induced fractures, vugs, or other reasons), over-gauge holes, rock reactivity, or other reasons. In some implementations, techniques for solving open hole problems can include lost circulation material replacements, cement plugs, sealant technologies, and mechanical repairs. Similar to the techniques discussed previously for cased hole problems, these techniques have limited capabilities and do not provide an efficient solution.

In some cases, an integrated solution can be used to solve well integrity issues. For example, an in-situ well integrity reconstruction device can be used to perform well integrity monitoring and reconstruction operations in the subterranean region of a reservoir. The in-situ well integrity reconstruction device can be attached to a drill pipe or other tubulars used to perform downhole operations. The in-situ well integrity reconstruction device can include a 3-dimensional (3D) imaging tool that scans the borehole for leaks, and a 3D laser head that performs the reconstruction operations. In some implementations, the in-situ well integrity reconstruction device can be remote controlled. For example, a surface device can receive the 3D images generated by the 3D imaging tool and output to an operator or other devices. The operator can instruct the in-situ well integrity reconstruction device to perform the reconstruction operations. Alternatively or additionally, the in-situ well integrity reconstruction device can perform the reconstruction operations automatically. For example, the in-situ well integrity reconstruction device can analyze the 3D images and instruct the 3D laser head to perform the reconstruction operations. FIGS. 1-9 and associated descriptions provide additional details of these implementations.

Using the in-situ well integrity reconstruction device to perform well integrity maintenance as described in this specification can provide one or more advantages. For example, the welding and healing operations can be performed during the drilling or other downhole operations, and therefore provide an efficient solution for well integrity while reducing operation interruptions. In addition, this approach provides a reliable solution that can address both cased and open hole problems, including for example: fractures in downhole formation rocks, wash-out or undesired enlargements of the drilled wellbores, channels and de-bonding areas in the downhole sheaths of cement, and cracks in downhole tubulars such as well casings. Moreover, this approach does not depend on isolations of specific hole section, inner diameter restrictions, or injectivity, and, therefore, is more convenient to operate. Furthermore, this approach is faster, less cumbersome, and can obtain a higher probability of success. The detection and visualization capabilities provide a view of the downhole troublesome zone during the curing process, reveal the root cause of the degradation, and help improving the drilling Other advantages will be apparent to those of ordinary skill in the art.

FIG. 1A is a schematic diagram that illustrates an example well system 100 having an open hole problem, according to an implementation. The example well system 100 can use an in-situ well integrity reconstruction device to direct a laser beam to a rock formation around a wellbore at a subterranean location to perform well integrity reconstruction operations, as described. Examples of the well integrity reconstruction operations include welding and healing the lost circulation zones, welding and sealing the fractured and unconsolidated rock zones, welding casing leaking and split zones, and rebuilding deteriorated casing sections. These operations can be performed during or after drilling.

The example well system 100 includes a wellbore 140 extending under the terranean surface 110. The wellbore 140 is drilled by a drill pipe 130 that is connected to a drilling bit 136. The wellbore 140 is surrounded by casing strings 134 and tubular 132 that protect the wellbore 140 in the downhole rock formation region 112.

The well system 100 includes an in-situ well integrity reconstruction device 190 that is installed on the drill pipe 130. The in-situ well integrity reconstruction device 190 includes a controller 170, a 3D imaging tool 160, a 3D laser head 150, and a laser generator 174. In some implementations, the drill pipe 130 can be replaced by other tubulars that are used to carry tools for downhole operations. Examples of the other tubulars can include casing tubular and coiled tubing.

The 3D imaging tool 160 is configured to scan objects and points of interest downhole and generate 3D images. The areas of interest targeted by the 3D imaging tool 160 can include: fractures in downhole formation rocks, channels and de-bonding areas in the downhole sheaths of cement, cracks in downhole tubulars or well casings. For example, the 3D imaging tool 160 can be used to scan the wellbore 140 and the downhole reservoir rock region 114 surrounding the wellbore 140 to detect the rock fractures at location 122. A 3D imaging tool can also be referred to as a 3D scanner.

Figure 9:
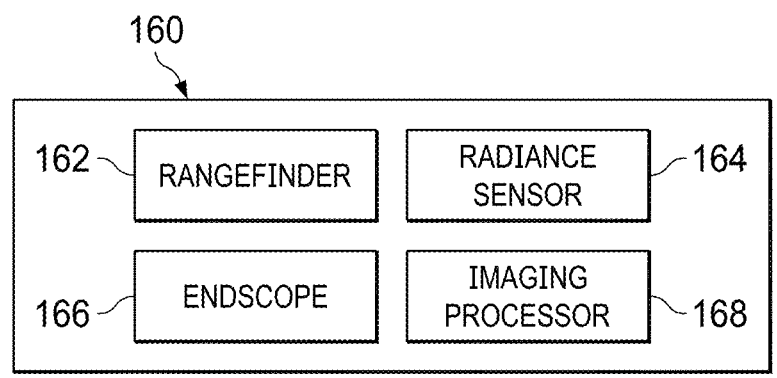
FIG. 9 is a schematic diagram that illustrates an example 3D imaging tool, according to an implementation.

FIG. 9 is a schematic diagram that illustrates an example 3D imaging tool 160, according to an implementation. The 3D imaging tool 160 includes a rangefinder 162, a radiance sensor 164, an endoscope 166, and an imaging processor 168. An 3D imaging tool may include additional, different, or fewer components as shown in FIG. 9, as appropriate.

The rangefinder 162 can be used to determine the distance to an object, the distance from a point, or both, in the wellbore 140 to the nearest surface of the wellbore wall. This rangefinder 162 can detect, map, and scan points of interest downhole such as formation rock fractures and caverns, casing leaks and tears, or cement de-bonding areas. In some implementations, the rangefinder 162 can be a laser rangefinder, which sends a laser pulse in a narrow beam towards the object and determines the range based on the time taken by the pulse to be reflected by the target and returned to the sender. The 3D imaging tool 160 also includes a radiance sensor 164. The radiance sensor 164 can be used to create depth maps of points of interest downhole. The depth maps can be used to enhance the data obtained by the rangefinder 162 by removing interferences such as fluids downhole.

The 3D imaging tool 160 can also include an endoscope 166. The endoscope 166 can generate optical images of the points of interest downhole. The images generated by the endoscope 166 can be used to further enhance the measurements made by the rangefinder 162 and the radiance sensor 164 by filtering interferences from the measure results. In some implementations, other imaging devices, for example, a downhole camera, can be used to generate optical images instead of the endoscope 166.

In some implementations, the 3D imaging tool 160 can also include one or more imaging processors 168. The imaging processor 168 can be configured to process the images generated by the endoscope 166. For example, the imaging processor 168 can image processing techniques that account for the attenuation of light created downhole due to the presence of drilling fluids (mud) and improve the signal-to-noise ratio.

In some implementations, the 3D imaging tool 160, or components of the 3D imaging tool 160 such as the rangefinder 162 and the radiance sensor 164, can be implemented as an integrated part of the drill pipe 130. Such implementation can enable the 3D imaging tool 160 or the components thereof to withstand downhole conditions such as high pressure, high temperature (HPHT), and exposure to sour gases or corrosion. The 3d imaging tool 160 or the components thereof can be integrated within the metal tubulars of the drill pipe 130 to create the Measurement While Drilling (MWD) of the Logging While Drilling (LWD) tools. The metal used to create these tools can be high strength carbon steel for normal ranges of downhole HPHT (up to 17,000 psi for pressure and 380° F. for temperature). For corrosive in-situ operation environments, Nickel based Corrosive Resistance Alloys (CRA) can be used. The corrosive environment is characterized by high $H_2S$ or $CO_2$ content and exposure. For higher ranges of pressure, temperature, and corrosion, the integrated components of the 3D imaging tool 160 can be incorporated within other high strength metal tubulars such as Duplex Stainless Steels. The integrated rangefinder 162 can employ an active measuring technique where unilateral transmission and passive reflection are used to measure the dimensions of a point of interest in the wellbore. The transmission signal can be a laser beam, short pulse of radio signal (electromagnetic radiation), sound propagation, Lidar, other electrical signals, or ultrasound signals.

Using the 3D imaging tool 160 to scan and identify problematic areas downhole can provide one or more advantages. For example, unlike traditional techniques such as corrosion logs or cement bonding logs, which target specific downhole problems with limited applicability, the 3D imaging tool 160 can be used to discover a wide range of issues, including for example, casing tears, formation fractures, cement de-bonding, or others. This approach works in cased holes and open holes. Additionally, this approach provides data with high resolution and reliability. The 3D imaging tool 160 can detect the area of integrity failure downhole by locating the depth, shape, and extent of failure with a high level of precision to enable the production of a 3D reconstruction of such area. Moreover, the 3D imaging tool 160 can be used to produce images and transmit the data to the surface for further analysis without interruption to operations in a drilling process. Examples of operations in the drilling process includes a drilling operation and a tripping operation (pulling drill pipe out of hole or running drill pipe in hole.

In some implementations, as illustrated, the 3D imaging tool 160 can be part of the in-situ well integrity reconstruction device 190 that is used to discover well integrity issues for reconstruction. In these or other cases, the images and results generated by the 3D imaging tool 160, including for example, the images and results generated by the rangefinder 162, the radiance sensor 164, and the endoscope 166, can be transmitted to the controller 170 to be used to direct the 3D laser head 150 to perform reconstruction operations. Alternatively or additionally, the 3D imaging tool 160 can be implemented as a stand-alone device attached to the drill pipe using bottom hole assembly. The 3D imaging tool 160 can perform scanning operations during the drilling process and transmit images to the surface device 176 in real-time for analysis. In some cases, clear drilling fluid are present in the tubular when the 3D imaging tool 160 performs the scanning operations.

Returning to FIG. 1A, the in-situ well integrity reconstruction device 190 also includes the laser generator 174. The laser generator 174 generates a laser beam that can be used by the 3D laser head 150 for reconstruction operations. In some implementations, the laser generator 174 can be implemented as part of the 3D laser head 150. Alternatively, the laser generator 174 can be implemented in a separate unit, for example, a device that generates laser beam on the surface and directs the laser beam to the 3D laser head 150 through a fiber optic cable.

Figure 2:
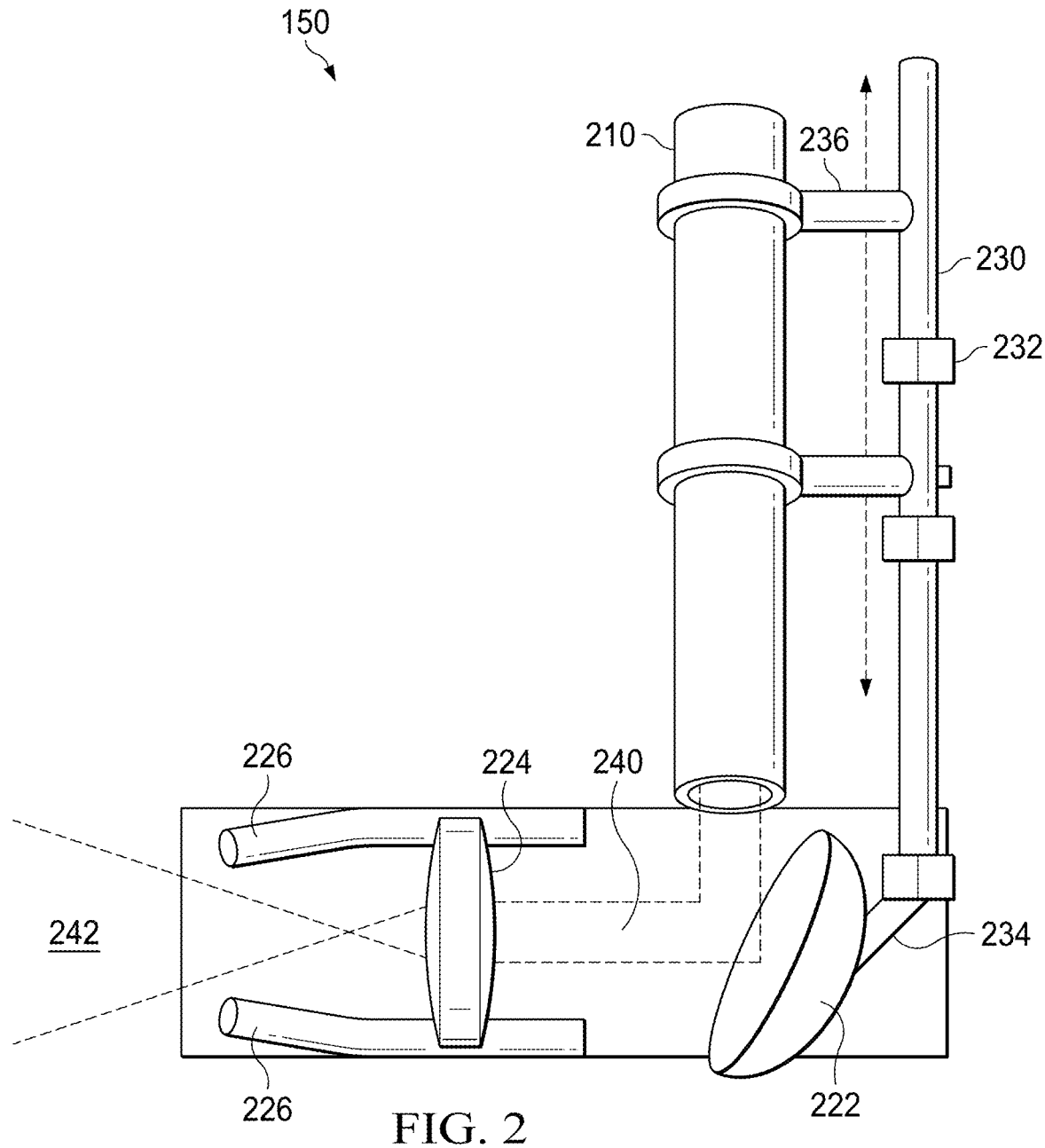
FIG. 2 is a block diagram of an example 3D laser head used to perform bottom hole well reconstruction, according to an implementation.

The in-situ well integrity reconstruction device 190 also includes the 3D laser head 150. The 3D laser head 150 is configured to direct laser beams generated by the laser generator 174 towards the rock fractures at location 122, for reconstruction operations. FIG. 2 and associated descriptions provide additional details of the operations of the 3D laser head 150.

Figure 3:
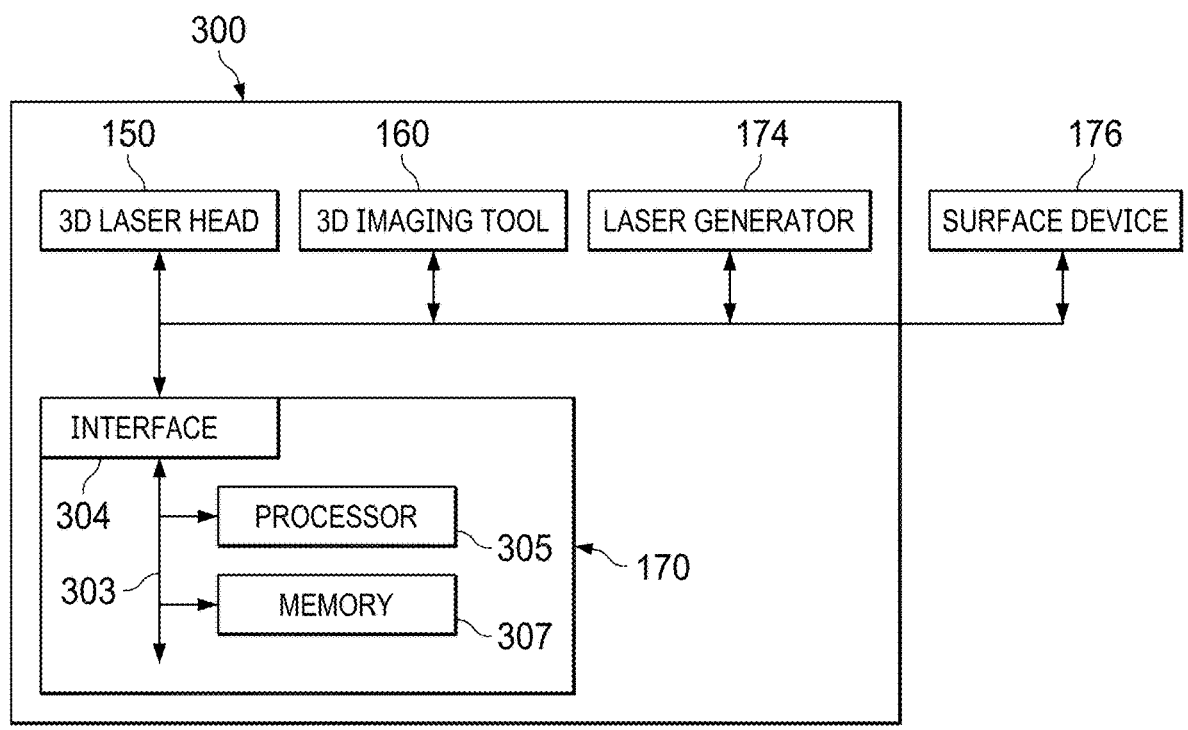
FIG. 3 is a block diagram of an example in-situ well integrity reconstruction device, according to an implementation.

The in-situ well integrity reconstruction device 190 also includes the controller 170. The controller 170 can include processors that are configured to control the operations of the 3D imaging tool 160, the 3D laser head 150, the laser generator 174, or any combinations thereof. The controller 170 can also interact with the surface device 176 to transmit measurement results and receive operation commands. FIG. 3 and associated descriptions provide additional details of the operations of the controller 170. In some cases, as illustrated, one controller 170 can be implemented to control multiple components of the in-situ well integrity reconstruction device. Alternatively or additionally, each of the components, for example, the 3D laser head 150 or the 3D imaging tool 160, can include a controller that controls the operations of the respective component.

The well system 100 also includes the surface device 176. The surface device 176 represents a computing device that is configured to interact with the in-situ well integrity reconstruction device. For example, the surface device 176 can receive measurement results from the 3D imaging tool 160 in real time. The measurement results can be outputted and analyzed by the surface device 176. A problematic area can be identified by the surface device 176 based on the measurement results. In some cases, the surface device 176 can instruct the 3D laser head 150 to perform reconstruction operations on the identified problematic area.

The well system 100 also includes a fiber optics cable 172. The fiber optics cable 172 can connect the in-situ well integrity reconstruction device 190 with the surface device 176 or other devices on the surface. The fiber optics cable 172 can be used to provide communications for the in-situ well integrity reconstruction device, or any components of the in-situ well integrity reconstruction device 190 with devices on the surface of the reservoir. In some implementations, the fiber optics cable 172 can also be used to supply power to the in-situ well integrity reconstruction device. For example, the fiber optics cable 172 can connect the in-situ well integrity reconstruction device 190 with a power generator operating on the surface. Alternatively or additionally, power for the in-situ well integrity reconstruction device 190 can be provided by a downhole power supplier such as a rechargeable battery, an energy harvester, a downhole turbine, or through the integrated power transmission of the drill pipe 130.

FIG. 1A illustrates an example open hole problem, where rock fractures are present at location 122, which is in the downhole reservoir rock region 114 that is beyond the depth of the casing strings 134. In operation, the 3D imaging tool 160 scans the location 122 and transmits the images to the controller 170, the surface device 176, or both. The 3D laser head 150 receives commands from the controller 170, the surface device 176, or both, and directs laser beams towards the location 122 to reconstruct the well. FIGS. 2-9 and associated descriptions provide additional details of these implementations.

Figure 1B:
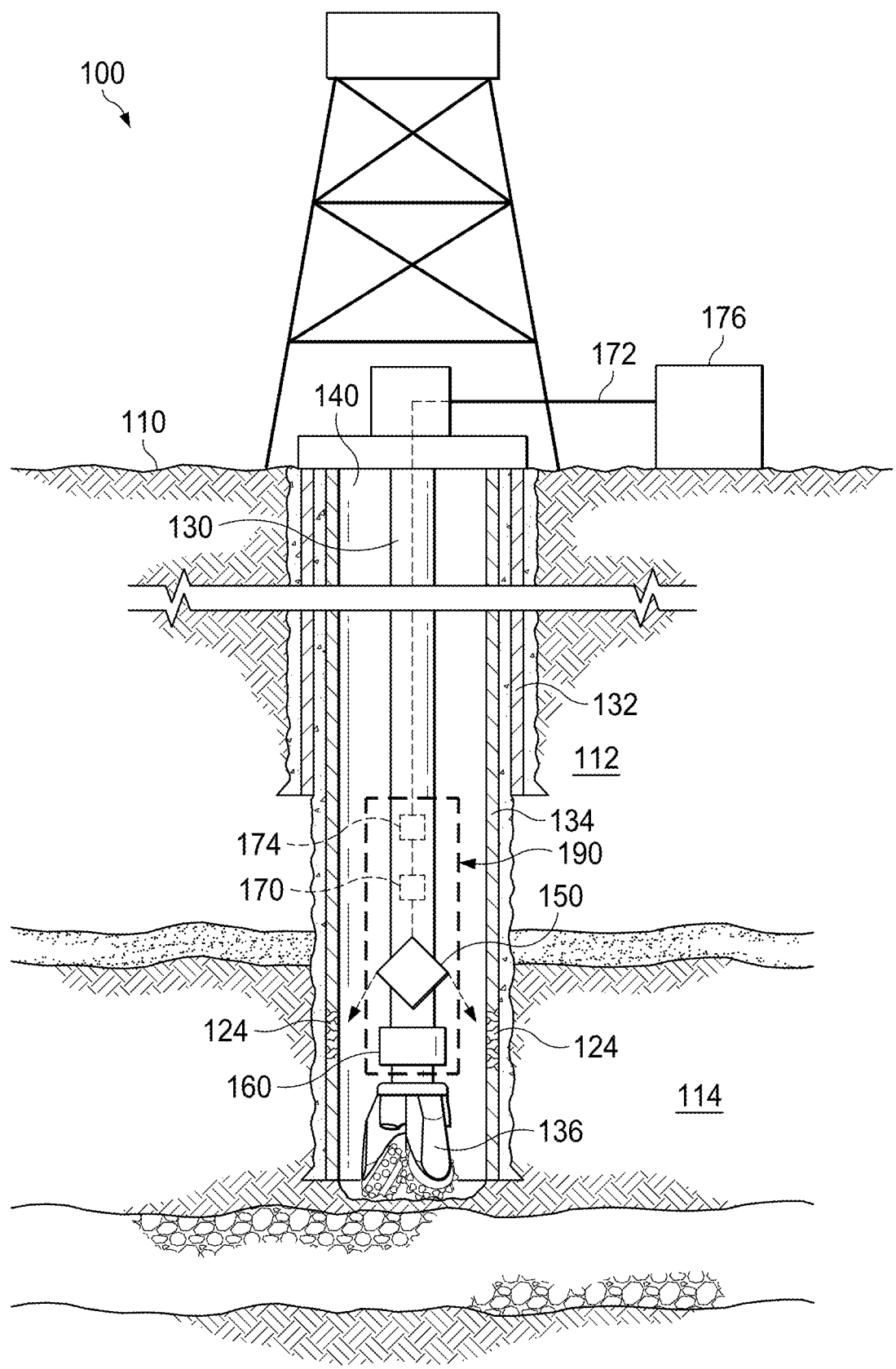
FIG. 1B is a schematic diagram that illustrates an example well system having a cased hole problem, according to an implementation.

FIG. 1B is a schematic diagram that illustrates an example well system having a cased hole problem, according to an implementation. As illustrated, the casing string 134 extends to the downhole reservoir rock region 114, and leaks are present at location 124. Similar to the operations described in FIG. 1A, the 3D imaging tool 160 can scan the location 124 and the 3D laser head 150 can direct laser beams towards the location 124 to fix the leaks.

FIG. 2 is a block diagram of an example 3D laser head 150 used to perform bottom hole well reconstruction, according to an implementation. At a high level, the 3D laser head 150 includes a cable 210, a protector 226, a focused lens 224, and a reflector 222 that are attached to a shaft 230. An 3D laser head may include additional, different, or fewer components as shown in FIG. 2, as appropriate.

The cable 210 is an insulated cable that protects the optical fiber inside the cable. The cable 210 is constructed using high temperature resistant and high pressure resistant materials for downhole operations. For example, the cable 210 can be constructed using off-the-shelf materials that protect the fiber optics cable from pressure, temperature, and hydrogen or other invasions from the wellbore or formation The optical fiber can conduct the laser beam 240 towards the reflector 222.

The reflector 222 is configured to reflect the laser beam 240 conducted from the optical fiber towards the focused lens 224. In some implementations, the reflector 222 can be a mirror, a beam splitter, or a prism. The focused lens 224 is configured to focus the laser beam 240 reflected by the reflector 222. As illustrated, the focused lens 224 can be a lens with a short focus so that the laser beam 240 can turn into a divergent beam 242. Both the reflector 222 and the focused lens 224 are constructed using materials that are suitable for downhole operations. For example, the reflector 222 and the focused lens 224 can be constructed using coated, high-energy, and high-intensity materials.

The protector 226 is configured to prevent any debris or dust from blocking the divergent beam 242. The protector 226 can also prevent these debris, including for example, air, gas, fluid, or dust, from damaging the focused lens 224. The protector 226 can be a set of knives, guards, or panels.

As illustrated, components such as the cable 210, the protector 226, the focused lens 224, and the reflector 222 are attached to the shaft 230. In some implementations, these components can be attached to the shaft 230 directly. Alternatively or additionally, some of components can be attached to the shaft 230 indirectly. For example, the focused lens 224 can be connected to the protector 226, which is in turn connected to the shaft 230. The cable 210 can be attached to the shaft 230 through one or more rings 236. The reflector 222 can be attached to the shaft 230 through an arm 234. The shaft 230 is attached to a tubular such as a drill pipe or a coiled tubular. In some cases, the shaft 230 can be attached to the tubular using one or more connectors 232. The shaft 230 can also be attached to the tubular using other components. In some implementations, instead of using a shaft, other mechanical devices can be used to connect these different components.

In operation, the laser beam 240 emits from the optical fiber inside the cable 210 towards the reflector 222. The laser beam 240 is reflected from the reflector 222 towards the focused lens 224. The laser beam 240 turns into the divergent beam 242 and is directed towards the area of leaks. The 3D laser head 150 is connected with a controller, for example the controller 170 in FIGS. 1A and 1B, and the controller can control the movement of 3D laser head 150 to place the reflector 222 and the focused lens 224 at a location and an angle that can direct the divergent beam 242 towards the location of the leak to be fixed. For example, the arm 234 can be rotated based on the commands received from the controller so that the reflector 222 can be rotated towards a specific angle. The connectors 232 can be released to disconnect the shaft 230 from the tubular when a command is received from the controller to move the 3D laser head 150 to a different location on the tubular. The connectors 232 can be re-engaged, and connect the shaft 230 with the tubular when the 3D laser head 150 has been moved to the designated location. FIG. 3 and associated descriptions provide additional details of the interactions between the controller and the 3D laser head 150. The tubular can be a drill pipe, a coiled tubing, a casing tubular, or other tubulars. The sealing operation can be performed when the tubular is engaged in a drilling operation, a tripping operation, or other operations during a drilling process or hydrocarbon product recovery process.

FIG. 3 is a block diagram of an example in-situ well integrity reconstruction device 300, according to an implementation. At a high level, the in-situ well integrity reconstruction device 300 includes the 3D laser head 150, the 3D imaging tool 160, and the laser generator 174 that are connected to the controller 170. A well integrity reconstruction device may include additional, different, or fewer components as shown in FIG. 3, as appropriate.

The controller 170 includes an interface 304, a processor 305, a memory 307 and a system bus 203. Although illustrated as a single interface 304 in FIG. 3, two or more interfaces 304 may be used according to particular needs, desires, or particular implementations of the controller 170. The interface 204 is used by the controller 170 for communicating with other components of the device 300, for example, the 3D laser head 150, the 3D imaging tool 160, and the laser generator 174. For example, the interface 204 can receive images transmitted by the 3D imaging tool 160, transmit commands to the 3D laser head 150 to position the 3D laser head 150 at the location corresponding to a leak, and transmit commands to the laser generator 174 to initiate the laser beam. The interface 204 can also be used by the controller 170 for communicating with other devices, for example, the surface device 176. For example, the interface 204 can transmit the images generated by the 3D imaging tool 160 to the master device. The interface 204 can receive commands from the surface device 176 to initiate or stop downhole well integrity monitoring or construction operations.

Generally, the interface 304 comprises logic encoded in software or hardware (or a combination of software and hardware). More specifically, the interface 304 may comprise software supporting one or more communication protocols associated with communications such that the device 300 and is operable to communicate physical signals within and outside of the illustrated device 300. The interface 304 can be configured to support wireline communication protocols, including for example, coaxial cable, optical cable, twisted pair, or other wireline communication technologies. The interface 304 can also be configured to support wireless communication protocols, including for example, microwaves, radiowaves, wireless local area network (WLAN), or other wireless communication technologies.

The controller 170 includes a processor 305. Although illustrated as a single processor 305 in FIG. 3, two or more processors may be used according to particular needs, desires, or particular implementations of the controller 170. Generally, the processor 305 executes instructions and manipulates data to perform the operations of the controller 170 and any algorithms, methods, functions, processes, flows, and procedures, as described in the instant disclosure. For example, the processor 305 can be configured to analyze the images generated by the 3D imaging tool 160 to determine whether a leak has been discovered, generate positioning commands for the 3D laser head 150 to place the 3D laser head 150 at the corresponding location, generate angling commands for the 3D laser head 150 to rotate the reflector and focused lens to the corresponding angles, and control the generation of the laser beam by the laser generator 174. The processor 305 can further be configured to analyze the effects of the laser beam reconstruction based on additional images from the 3D imaging tool and determine whether to generate additional laser beam towards the leak.

The controller 170 also includes a memory 307 that can hold data for the controller 170. In some cases, the memory 307 can also hold programming instructions that are executable by the processor 305 to perform operations discussed previously. For example, memory 307 can be random access memory (RAM), read only memory (ROM), optical, magnetic, and the like, storing data consistent with this disclosure. In some implementations, memory 307 can be a combination of two or more different types of memory (for example, a combination of RAM and magnetic storage) according to particular needs, desires, or particular implementations of the controller 170 and the described functionality. Although illustrated as a single memory 307 in FIG. 3, two or more memories 307 (of the same or a combination of types) can be used according to particular needs, desires, or particular implementations of the controller 170 and the described functionality.

Each of the components of the controller 170 can communicate using the system bus 303. In some implementations, any or all of the components of the controller 170, hardware or software (or a combination of both hardware and software), may interface with each other or the interface 304 (or a combination of both), over the system bus 303, using standardized or proprietary protocols.

Figure 4:
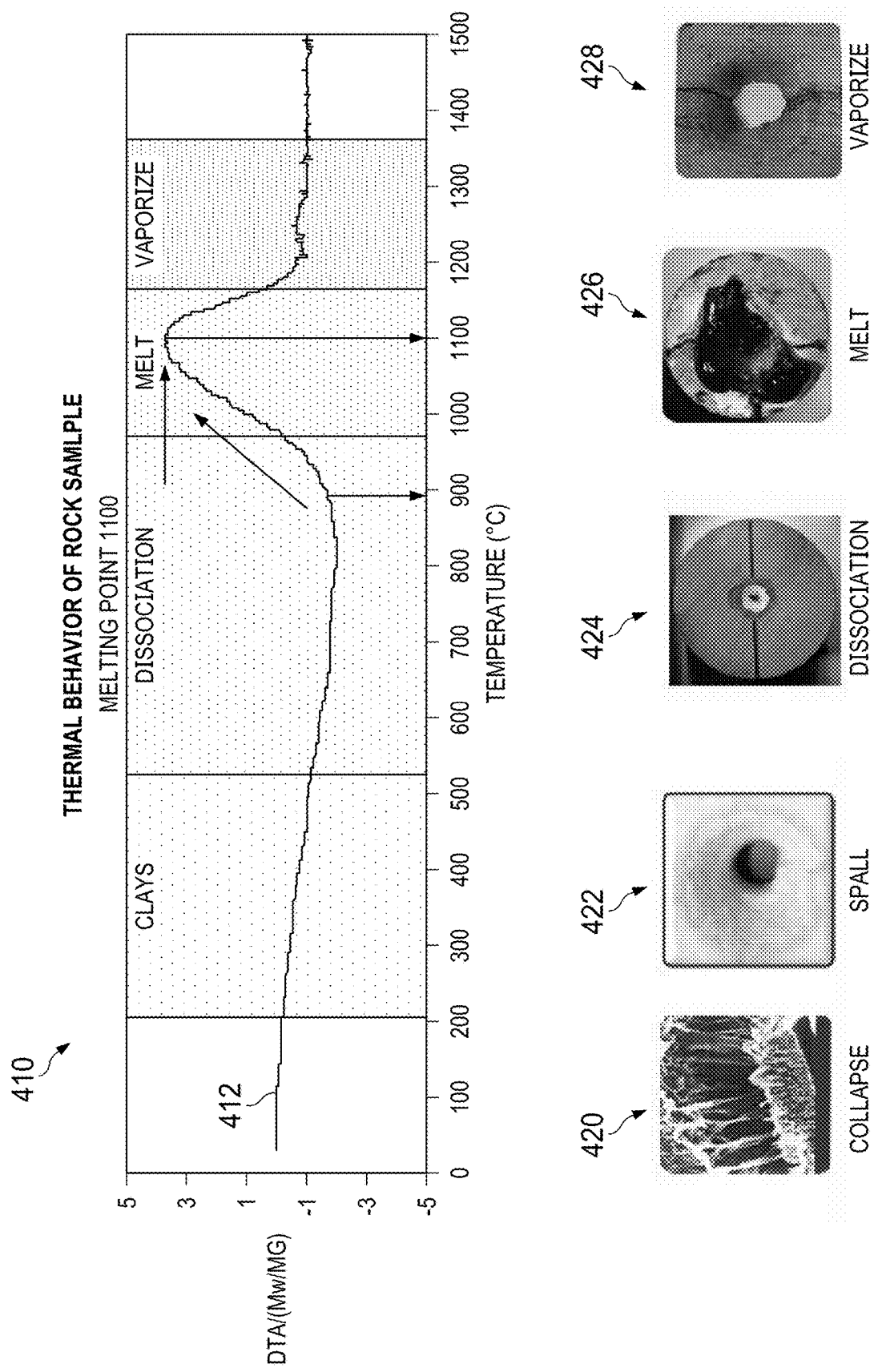
FIG. 4 illustrates example effects of laser sealing, according to an implementation.

FIG. 4 illustrates example effects of laser sealing, according to an implementation. FIG. 4 includes a chart 410 that illustrates example thermal analysis. The chart 410 includes a curve 412 for clay. As illustrated, clays can collapse under about 200 degrees, spall at about 400 degrees, dissociate at about 900 degrees, melt at about 1100 degrees, and vaporizes at about 1300 degrees. Pictures 420, 422, 424, 426, and 428 show example effects of collapsing, spalling, dissociation, melting, and vaporization, respectively. Other rock types may have different curves. For example, sandstone may melt at about 1400 degrees, and limestone may dissociate at 1100 degrees. In some cases, the type of rocks around the leaks to be fixed can be determined, and the laser beam can be configured to deliver the energy required to melt, vaporize or dissociated the rock. For example, the laser beam can be configured to melt the rocks in a sealing operation. The temperature increase on the rock is based on several factors, including rock type and thermal properties, rock color, laser power, spot size, and time. Therefore, rock temperature under the laser beam can be controlled based on these parameters.

In some implementations, the types of rocks can be determined based on one or more of the following techniques. In one example, the types of rocks can be determined based on off-set wells data. If the planned well is drilled in an area where other wells have been drilled previously, the information from these old and nearby wells (referred to offset wells) can be used to determine the formations that will be penetrated by the new well and the type of rocks comprising each formation. In another example, the types of rocks can be determined based on rock cuttings during the drilling process. During the drilling process of the new well, rock cuttings produced by the drill bit downhole are transported to the surface through the circulating drilling fluids and are filtered from the fluids using solids control equipment on the surface. These rock cuttings are used to characterize the type of rocks drilled and correlated to a depth interval. In yet another example, the types of rocks can be determined based on the trends and behaviors of the drill bit and drill string. During the drilling process, trends and behaviors of the drill bit and the drill string can be detected at the surface. These trends and behaviors can be used to predict a change of the rock type being drilled. For example, sudden changes in the rate of penetration (ROP) of the drill bit can be correlated to a change in the rock type drilled. In yet another example, the types of rocks can be determined based on measurement of MWD or LWD tools operating during the drilling process. Example measurements performed by these MWD or LWD tools can include gamma ray radiations, quantifying the hydrogen or neutron contents, measuring resistivity, and sonic waves travel times. In some cases, a combination of these techniques can be used to determine the types of rocks. Based on the types of rocks, different laser power, spot size, or time can be configured to obtain the target temperature to melt the rocks.

In some implementations, the sealing operation can also be directed to materials other than the rock formation at point of leaks. For example, the leak can be located at a downhole location on a casing tubular, and the laser beam can be directed to the portion of the casing tubular where the leak occurs.

Figure 5:
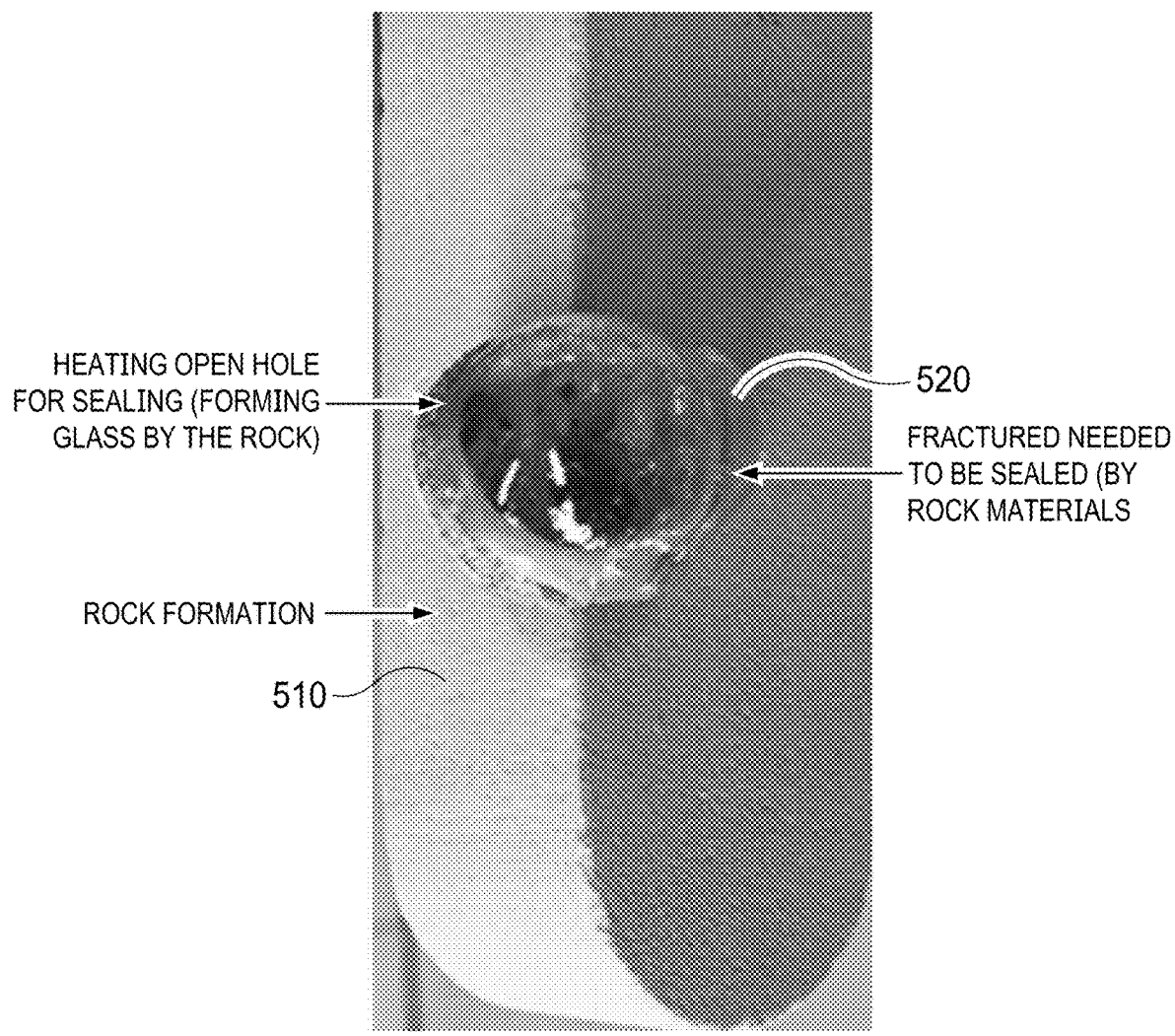
FIG. 5 illustrates an example laser sealing operation, according to an implementation.

FIG. 5 illustrates an example laser sealing operation, according to an implementation. As illustrated, location 520 represents the location of an open hole leak in rock formation 510. Under the laser beam, glass was formed by the rock to seal the leak and stop loss circulation.

Figure 6:
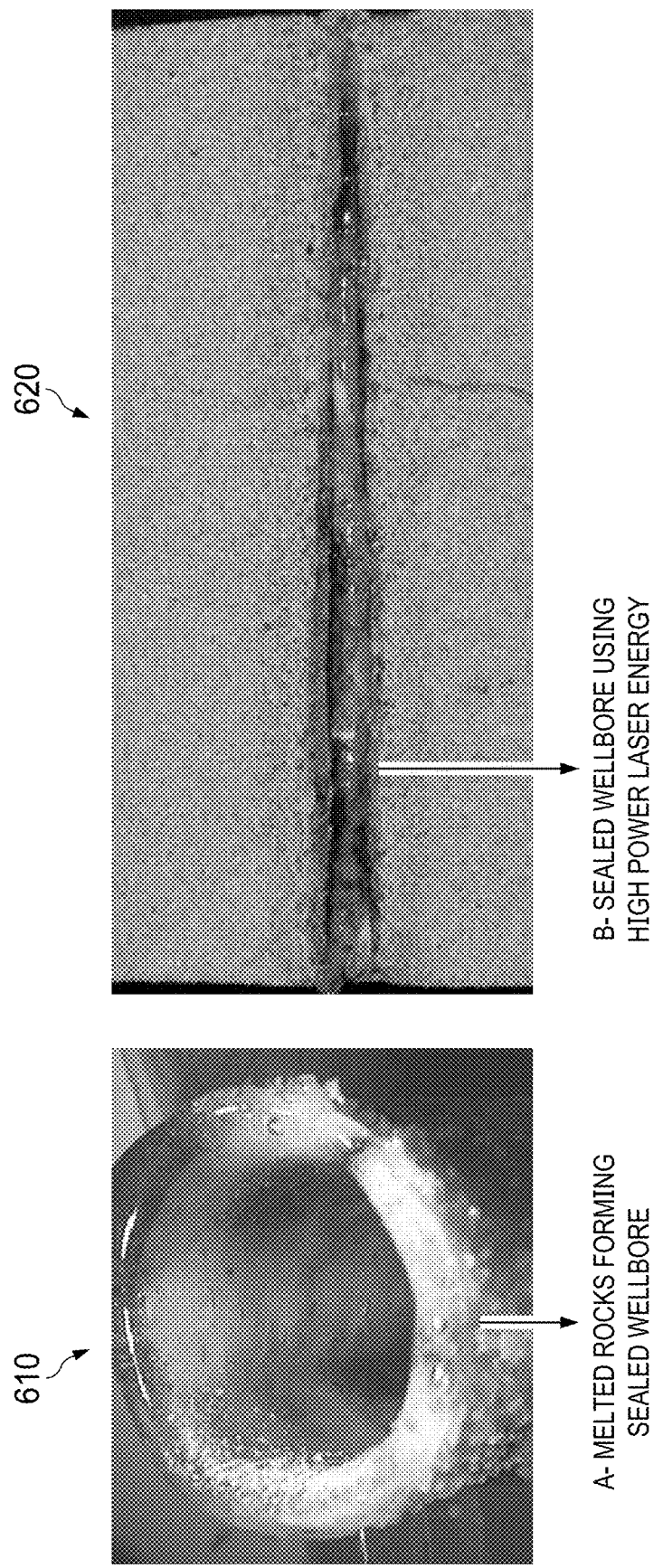
FIG. 6 illustrates another example laser sealing operation, according to an implementation.

FIG. 6 illustrates another example laser sealing operation, according to an implementation. Photo 610 shows the glass structured of fused silica that sealed the wellbore, while photo 620 shows the cross section of the sealed wellbore.

Figure 7:
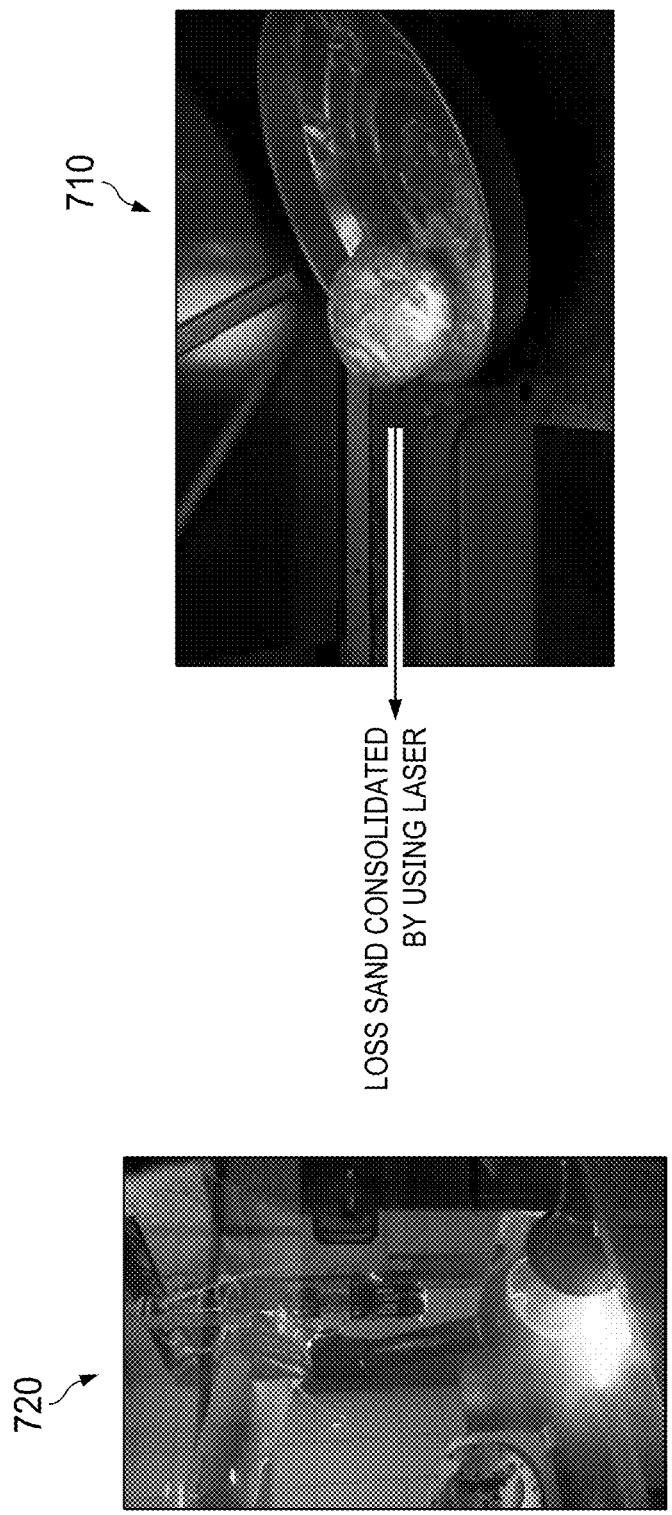
FIG. 7 illustrates yet another example laser sealing operation, according to respective implementations.

FIG. 7 illustrates yet another example laser sealing operation, according to respective implementations. Photo 710 shows loss sand consolidated by laser beam for sealing, while photo 720 shows a laser beam that is delivered to the loss sand.

Figure 8:
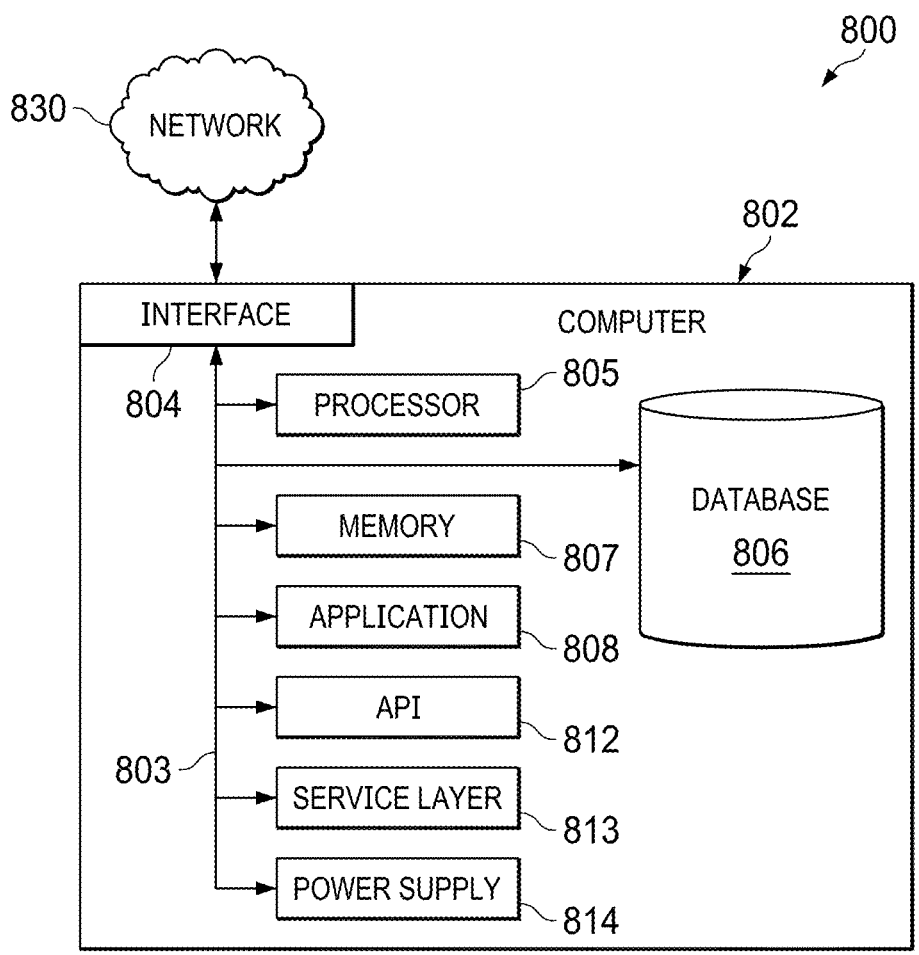
FIG. 8 is a block diagram of an example computer system used to provide computational functionalities associated with described algorithms, methods, functions, processes, flows, and procedures, as described in the instant disclosure, according to an implementation.

FIG. 8 is a block diagram of an example computer system 800 used to provide computational functionalities associated with described algorithms, methods, functions, processes, flows, and procedures, as described in the instant disclosure, according to an implementation. The computer system 800, or more than one computer system 800, can be used to implement the surface device that interopreates with the in-situ well integrity reconstruction device as described previously. The computer system 800, or more than one computer system 800, can also be used to send commands to the in-situ well integrity reconstruction device to control the operations of the in-situ well integrity reconstruction device.

The illustrated computer 802 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 802 may comprise a computer that includes an input device, such as a keypad, keyboard, touch screen, or other device that can accept user information, and an output device that conveys information associated with the operation of the computer 802, including digital data, visual, or audio information (or a combination of information), or a graphical user interface (GUI).

The computer 802 can serve in a role as a client, network component, a server, a database or other persistency, or any other component (or a combination of roles) of a computer system for performing the subject matter described in the instant disclosure. The illustrated computer 802 is communicably coupled with a network 830. In some implementations, one or more components of the computer 802 may be configured to operate within environments, including cloudcomputing-based, local, global, or other environment (or a combination of environments).

At a high level, the computer 802 is an electronic computing device operable to receive, transmit, process, store, or manage data and information associated with the described subject matter. According to some implementations, the computer 802 may also include, or be communicably coupled with, an application server, e-mail server, web server, caching server, streaming data server, or other server (or a combination of servers).

The computer 802 can receive requests over network 830 from a client application (for example, executing on another computer 802) and respond to the received requests by processing the received requests using an appropriate software application(s). In addition, requests may also be sent to the computer 802 from internal users (for example, from a command console or by other appropriate access methods), external or third-parties, other automated applications, as well as any other appropriate entities, individuals, systems, or computers.

Each of the components of the computer 802 can communicate using a system bus 803. In some implementations, any or all of the components of the computer 802, hardware or software (or a combination of both hardware and software), may interface with each other or the interface 804 (or a combination of both), over the system bus 803 using an application programming interface (API) 812 or a service layer 813 (or a combination of the API 812 and service layer 813). The API 812 may include specifications for routines, data structures, and object classes. The API 812 may be either computer-language independent or dependent and may refer to a complete interface, a single function, or even a set of APIs. The service layer 813 provides software services to the computer 802 or other components (whether or not illustrated) that are communicably coupled to the computer 802. The functionality of the computer 802 may be accessible for all service consumers using this service layer. Software services, such as those provided by the service layer 813, provide reusable, defined functionalities through a defined interface. For example, the interface may be software written in JAVA, C++, or other suitable language providing data in extensible markup language (XML) format or other suitable format. While illustrated as an integrated component of the computer 802, alternative implementations may illustrate the API 812 or the service layer 813 as stand-alone components in relation to other components of the computer 802 or other components (whether or not illustrated) that are communicably coupled to the computer 802. Moreover, any or all parts of the API 812 or the service layer 813 may be implemented as child or sub-modules of another software module, enterprise application, or hardware module without departing from the scope of this disclosure.

The computer 802 includes an interface 804. Although illustrated as a single interface 804 in FIG. 8, two or more interfaces 804 may be used according to particular needs, desires, or particular implementations of the computer 802. The interface 804 is used by the computer 802 for communicating with other systems that are connected to the network 830 (whether illustrated or not) in a distributed environment. Generally, the interface 804 comprises logic encoded in software or hardware (or a combination of software and hardware) and is operable to communicate with the network 830. More specifically, the interface 804 may comprise software supporting one or more communication protocols associated with communications such that the network 830 or interface's hardware is operable to communicate physical signals within and outside of the illustrated computer 802. For example, the interface 804 can be used to receive 3D images from the in-situ well integrity reconstruction device, transmit operating command to the in-situ well integrity reconstruction device, or a combination thereof.

The computer 802 includes a processor 805. Although illustrated as a single processor 805 in FIG. 8, two or more processors may be used according to particular needs, desires, or particular implementations of the computer 802. Generally, the processor 805 executes instructions and manipulates data to perform the operations of the computer 802 and any algorithms, methods, functions, processes, flows, and procedures as described in the instant disclosure.

The computer 802 also includes a database 806 that can hold data for the computer 802 or other components (or a combination of both) that can be connected to the network 830 (whether illustrated or not). The database 806 can be an in-memory, conventional, or other type of database storing data consistent with this disclosure. In some implementations, database 806 can be a combination of two or more different database types (for example, a hybrid in-memory and conventional database) according to particular needs, desires, or particular implementations of the computer 802 and the described functionality. Although illustrated as a single database 806 in FIG. 8, two or more databases (of the same or combination of types) can be used according to particular needs, desires, or particular implementations of the computer 802 and the described functionality. While database 806 is illustrated as an integral component of the computer 802, in alternative implementations, database 806 can be external to the computer 802.

The computer 802 also includes a memory 807 that can hold data for the computer 802 or other components (or a combination of both) that can be connected to the network 830 (whether illustrated or not). For example, memory 807 can be random access memory (RAM), read-only memory (ROM), optical, magnetic, and the like, storing data consistent with this disclosure. In some implementations, memory 807 can be a combination of two or more different types of memory (for example, a combination of RAM and magnetic storage) according to particular needs, desires, or particular implementations of the computer 802 and the described functionality. Although illustrated as a single memory 807 in FIG. 8, two or more memories 807 (of the same or combination of types) can be used according to particular needs, desires, or particular implementations of the computer 802 and the described functionality. While memory 807 is illustrated as an integral component of the computer 802, in alternative implementations, memory 807 can be external to the computer 802.

The application 808 is an algorithmic software engine providing functionality according to particular needs, desires, or particular implementations of the computer 802, particularly with respect to functionality described in this disclosure. For example, application 808 can serve as one or more components, modules, or applications. Further, although illustrated as a single application 808, the application 808 may be implemented as multiple applications 808 on the computer 802. In addition, although illustrated as integral to the computer 802, in alternative implementations, the application 808 can be external to the computer 802.

The computer 802 can also include a power supply 814. The power supply 814 can include a rechargeable or non-rechargeable battery that can be configured to be either user- or non-user-replaceable. In some implementations, the power supply 814 can include power-conversion or management circuits (including recharging, standby, or other power management functionality). In some implementations, the power-supply 814 can include a power plug to allow the computer 802 to be plugged into a wall socket or other power source to, for example, power the computer 802 or recharge a rechargeable battery.

There may be any number of computers 802 associated with, or external to, a computer system containing computer 802, each computer 802 communicating over network 830. Further, the term "client," "user," and other appropriate terminology may be used interchangeably, as appropriate, without departing from the scope of this disclosure. Moreover, this disclosure contemplates that many users may use one computer 802, or that one user may use multiple computers 802.

Described implementations of the subject matter can include one or more features, alone or in combination.

For example, in a first implementation, a method for downhole well integrity reconstruction in a hydrocarbon reservoir includes: positioning, a laser head at a first subterranean location, wherein the laser head is attached to a tubular inside of a wellbore; directing, by the laser head, a laser beam towards a leak on the wellbore; and sealing the leak using the laser beam.

The foregoing and other described implementations can each, optionally, include one or more of the following features:

A first feature, combinable with any of the following features, wherein the laser head includes a reflector and a focused lens, and wherein the method further comprises: rotating the reflector and the focused lens to aim at the leak.

A second feature, combinable with any of the previous or following features, wherein the laser head further includes a protector that blocks debris for the focused lens.

A third feature, combinable with any of the previous or following features, wherein the laser head further includes an insulated cable that protects optical fibers, and wherein the optical fibers conduct the laser beam.

A fourth feature, combinable with any of the previous or following features, wherein the leak is sealed while the tubularis engaged in a drilling operation or a tripping operation.

A fifth feature, combinable with any of the previous or following features, wherein the leak is located in an open hole.

A sixth feature, combinable with any of the previous or following features, wherein the leak is located in a cased hole.

A seventh feature, combinable with any of the previous or following features, the method further comprising: receiving a command from a controller that is communicatively coupled with the laser head, and wherein the laser head is positioned at the first subterranean location in response to the command.

An eighth feature, combinable with any of the previous or following features, wherein the first subterranean location is determined based on images generated by an imaging tool that operates inside the wellbore.

A ninth feature, combinable with any of the previous or following features, wherein the tubular is a drill pipe.

A tenth feature, combinable with any of the previous features, the method further comprising: determining a type of rock around the leak; and sealing the leak based on the type of rock.

In a second implementation, an in-situ well integrity reconstruction device includes: a 3-dimensional (3D) laser head; at least one hardware processor; and a non-transitory computer-readable storage medium coupled to the at least one hardware processor and storing programming instructions for execution by the at least one hardware processor, wherein the programming instructions, when executed, cause the in-situ well integrity reconstruction device to perform operations comprising: positioning, the 3D laser head at a first subterranean location, wherein the 3D laser head is attached to a tubular inside of a wellbore; and wherein the 3D laser head is configured to: direct a laser beam towards a leak at the first subterranean location; and seal the leak using the laser beam.

The foregoing and other described implementations can each, optionally, include one or more of the following features:

A first feature, combinable with any of the following features, wherein the 3D laser head comprises a reflector and a focused lens, and the reflector and the focused lens are configured to be rotated to aim at the leak.

A second feature, combinable with any of the previous or following features, wherein the 3D laser head comprises a protector that blocks debris for the focused lens.

A third feature, combinable with any of the previous or following features, wherein the 3D laser head comprises an insulated cable that protects optical fibers, and wherein the optical fibers conduct the laser beam.

A fourth feature, combinable with any of the previous or following features, the in-situ well integrity reconstruction device further comprising a 3D scanner configured to generate images inside the wellbore.

A fifth feature, combinable with any of the previous or following features, wherein the first subterranean location is determined based on the images generated by the 3D scanner.

A sixth feature, combinable with any of the previous features, wherein the tubular is a drill pipe.

In a third implementation, an in-situ 3-dimensional (3D) laser head includes: a reflector that is attached to a tubular inside of a wellbore; a focused lens; and wherein the reflector is configured to reflect a laser beam towards the focused lens; and the reflector and the focused lens are configured to be rotatable to aim towards a leak on the wellbore.

A first feature, combinable with any of the following features, the in-situ 3D laser head further comprising an insulated cable that protects optical fibers, and wherein the optical fibers conduct the laser beam.

In a fourth implementation, an in-situ 3-dimensional (3D) scanner includes: a rangefinder configured to measure a distance between a subterranean location and a surface of a well; and a radiance sensor configured to generate a depth map of the subterranean location.

The foregoing and other described implementations can each, optionally, include one or more of the following features:

A first feature, combinable with any of the following features, the in-situ 3D scanner further comprising an endoscope configured to generate an image of the subterranean location.

A second feature, combinable with any of the previous or following features, wherein the endoscope is configured to generate the image by filtering interferences from measure results of the rangefinder and the radiance sensor.

A third feature, combinable with any of the previous or following features, the in-situ 3D scanner further comprising an image processor configured to process the image generated by the endoscope.

A fourth feature, combinable with any of the previous or following features, the in-situ 3D scanner further comprising a downhole camera configured to generate an image of the subterranean location.

A fifth feature, combinable with any of the previous or following features, wherein the rangefinder is integrated with a tubular.

A sixth feature, combinable with any of the previous or following features, wherein the rangefinder is integrated with the tubular using high strength carbon steel.

A seventh feature, combinable with any of the previous or following features, wherein the tubular is a drill pipe.

An eighth feature, combinable with any of the previous features, the in-situ 3D scanner further comprising a transmitter configured to transmit measurement results of the rangefinder and the radiance sensor to the surface of the well.

In a fifth implementation, a method for downhole well leak detection in a hydrocarbon reservoir, comprising: positioning, a 3-dimensional (3D) scanner at a subterranean location, wherein the 3D scanner is attached to a tubular inside of a wellbore; generating an image of the subterranean location; and transmitting the image to a surface of a well.

The foregoing and other described implementations can each, optionally, include one or more of the following features:

A first feature, combinable with any of the following features, wherein the 3D scanner comprises a rangefinder configured to measure a distance between the subterranean location and the surface of the well.

A second feature, combinable with any of the previous or following features, wherein the 3D scanner comprises a radiance sensor configured to generate a depth map of the subterranean location.

A third feature, combinable with any of the previous or following features, wherein the 3D scanner comprises an endoscope configured to generate an image of the subterranean location.

A fourth feature, combinable with any of the previous or following features, wherein the 3D scanner an image processor configured to process the image generated by the endoscope.

A fifth feature, combinable with any of the previous or following features, wherein the 3D scanner comprises a downhole camera configured to generate the image of the subterranean location.

A sixth feature, combinable with any of the previous or following features, wherein the rangefinder is integrated with the tubular.

A seventh feature, combinable with any of the previous features, wherein the tubular is a drill pipe.

In a sixth implementation, a method for downhole well integrity reconstruction in a hydrocarbon reservoir includes: positioning, a 3-dimensional (3D) scanner at a subterranean location, wherein the 3D scanner is attached to a tubular inside of a wellbore; generating an image of the subterranean location; determining, based on the image, that a leak is located at the subterranean location; positioning, a laser head at the subterranean location, wherein the laser head is attached to the tubular; directing, by the laser head, a laser beam towards the leak; and sealing the leak using the laser beam.

The foregoing and other described implementations can each, optionally, include one or more of the following features:

A first feature, combinable with any of the following features, wherein the tubular is a drill pipe.

A second feature, combinable with any of the previous features, wherein the leak is sealed while the tubular is engaged in a drilling operation or a tripping operation.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include, special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A method for downhole well integrity reconstruction in a hydrocarbon reservoir, comprising:
    positioning, a laser head at a first subterranean location, wherein the laser head is attached to a tubular inside of a wellbore;
    directing, by the laser head, a laser beam towards a cased hole leak on the wellbore;
    determining a type of rock around the leak; and
    sealing the cased hole leak using the laser beam according to the determined type of rock around the leak.

2. The method of claim 1, wherein the laser head includes a reflector and a focused lens, and wherein the method further comprises: rotating the reflector and the focused lens to aim at the leak.

3. The method of claim 1, wherein the laser head further includes an insulated cable that protects optical fibers, and wherein the optical fibers conduct the laser beam.

4. The method of claim 1, wherein the leak is sealed while the tubular is engaged in a drilling operation or a tripping operation.

5. The method of claim 1, further comprising: receiving a command from a controller that is communicatively coupled with the laser head, and wherein the laser head is positioned at the first subterranean location in response to the command.

6. The method of claim 1, wherein the first subterranean location is determined based on images generated by an imaging tool that operates inside the wellbore.

7. The method of claim 1, wherein the tubular is a drill pipe.

8. The method of claim 2, wherein the laser head further includes a protector that blocks debris for the focused lens.

* * * * *